(12) United States Patent
Sass

(10) Patent No.: US 9,974,425 B2
(45) Date of Patent: May 22, 2018

(54) METHOD AND MEANS FOR POSITIONING A HIGH RISE LOOP FOR A DISHWASHER'S DISCHARGE HOSE

(71) Applicant: Leland W. Sass, Apache Junction, AZ (US)

(72) Inventor: Leland W. Sass, Apache Junction, AZ (US)

( * ) Notice: Subject to any disclaimer, the term of this patent is extended or adjusted under 35 U.S.C. 154(b) by 0 days. days.

(21) Appl. No.: 15/608,956

(22) Filed: May 30, 2017

(65) Prior Publication Data

US 2017/0340187 A1      Nov. 30, 2017

Related U.S. Application Data

(60) Provisional application No. 62/342,941, filed on May 28, 2016.

(51) Int. Cl.
*F16M 13/00*      (2006.01)
*A47L 15/42*      (2006.01)
*E03C 1/12*       (2006.01)

(52) U.S. Cl.
CPC .......... *A47L 15/4223* (2013.01); *E03C 1/12* (2013.01)

(58) Field of Classification Search
CPC ..... F16L 3/003; F16L 3/26; F16L 3/00; F16L 3/02

USPC .......................................... 248/49, 65, 75, 80
See application file for complete search history.

(56) References Cited

U.S. PATENT DOCUMENTS

| | | | | | |
|---|---|---|---|---|---|
| D263,903 | S | * | 4/1982 | Johnston | D23/217 |
| D281,576 | S | * | 12/1985 | Akers | D6/553 |
| 5,088,666 | A | * | 2/1992 | Lang | B05B 15/00 239/276 |
| 6,195,926 | B1 | * | 3/2001 | Jarl | G09F 3/08 248/87 |
| D628,464 | S | * | 12/2010 | Oskey | D8/356 |
| 8,632,037 | B1 | * | 1/2014 | Rael | F16L 3/003 248/534 |
| 2009/0266385 | A1 | * | 10/2009 | Haltmayer | A47L 15/4246 134/104.4 |
| 2011/0012485 | A1 | * | 1/2011 | Busing | A47L 15/4217 312/228 |

* cited by examiner

*Primary Examiner* — Steven M Marsh
(74) *Attorney, Agent, or Firm* — Scott A. Hill; The Hill Law Firm, PLC

(57) ABSTRACT

A high-loop bracket has a handle portion that allows a user to manipulate a hose support portion that supports an electric dishwasher's discharge hose into a position that easily forms a high rise loop. The high rise loop is fixed against a sink base cabinet by securing an easy to reach mount portion of the high-loop bracket. Preferably, the high-loop bracket is formed from a single sheet of stainless steel that is bent to create the various portions of the bracket.

12 Claims, 4 Drawing Sheets

Fig. 9
Fig. 10
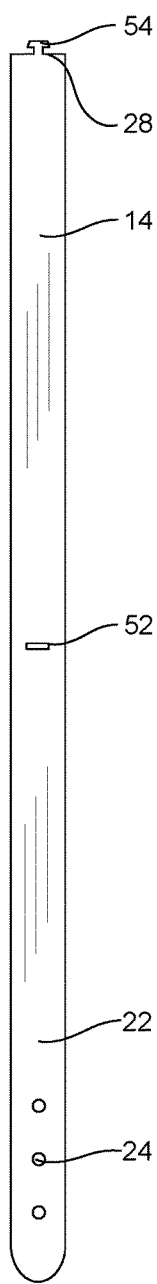
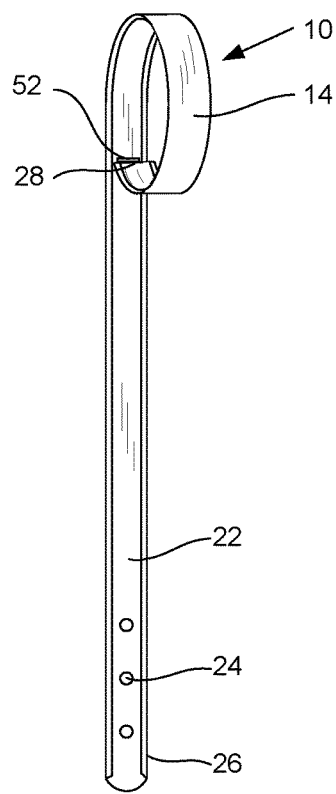
10 High-loop bracket
12 Hose Aperture
14 Hose support portion
16 Guard
18 Split
20 Bend
22 Handle portion
24 Mount portion
26 Folded edge
28 Curled end
30 Discharge hose
32 High rise loop
40 Sink base cabinet
42 Countertop
44 Sink basin
46 Garbage disposal
48 Spot welds
50 Hand
52 Slot
54 Hook

METHOD AND MEANS FOR POSITIONING A HIGH RISE LOOP FOR A DISHWASHER'S DISCHARGE HOSE

BACKGROUND OF THE INVENTION

To prevent sink water from flowing into a dishwasher, a portion of a dishwasher's discharge hose needs to be higher than the highest level of water in a sink basin that shares a drain with the dishwasher. Some discharge hoses are connected to anti-siphon devices that mount above countertop level, but these devices make a mess when they fail. Commonly, dishwasher discharge hoses are provided with a high rise loop by attaching a bracket near the top of a kitchen's sink base cabinet before a sink is installed. It is often nearly impossible to remove such a bracket without removing the sink, so changing the hose or trying to loosen the hose to be able to pull out a dishwasher becomes challenging. There is a need for an easy method to position and remove a high rise loop for a dishwasher's discharge hose.

SUMMARY OF THE INVENTION

The preferred embodiment of the present invention uses a stainless steel bracket characterized by a handle portion having a hose support portion on one end and a cabinet mount portion on the other end. When this high-loop bracket is installed, a high rise loop is formed in a discharge hose supported by the hose support portion, preferably as high as possible between a sink basin and a wall of a sink base cabinet. The discharge hose is passed through the hose support portion, and then the handle portion is used to manipulate the discharge hose to create and position a high rise loop in a desired position. Once positioned, the mount portion is secured to the sink base cabinet using one or more fasteners, preferably screws. Unlike common hose brackets, the relatively long handle portion causes the mounting means to be adequately spaced below the high rise loop such that the mounting means is visible and easily accessible below the sink basin. With easy access to the mount portion, a common screwdriver is employed to screw the mount portion to the sink base cabinet. Alternative hose support portions and mounting means will be discussed, but all high-loop brackets will include a handle portion that makes it easy to create and position a high rise loop.

BRIEF DESCRIPTION OF THE DRAWINGS

FIG. 9 is a plan view of stamped sheet metal used to form another alternative high-loop bracket.

FIG. 10 is a perspective view of the high-loop bracket formed by folding the sheet metal shown in FIG. 9.

Figure 1:
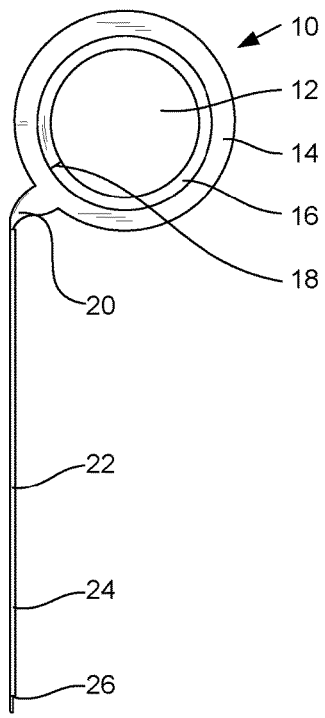
FIG. 1 is a side view of a preferred high-loop bracket of the present invention.

The following is the list of numerical callouts used in FIGS. 1-10:
10 High-loop bracket
12 Hose Aperture
14 Hose support portion
16 Guard
18 Split
20 Bend
22 Handle portion
24 Mount portion
26 Folded edge
28 Curled end
30 Discharge hose
32 High rise loop
40 Sink base cabinet
42 Countertop
44 Sink basin
46 Garbage disposal
48 Spot welds
50 Hand
52 Slot
54 Hook

DETAILED DESCRIPTION OF THE INVENTION

This detailed description will describe a high-loop bracket 10 from the top down, followed by its installation. Generally, as shown in the various figures, the high-loop bracket has a hose support portion 14 above a handle portion 22 and a mount portion 24. In the most preferred embodiment, such as is shown in FIGS. 1-5, the high-loop bracket is made from a single piece of stainless steel that is cut, folded and bent to shape so that it is strong and reliable for at least the life of a dishwasher. Other rigid materials, such as plastic or aluminum, could be used to mold or form a high-loop bracket. When metal is used, folded edges 26 in the handle portion should reduce the risk of sharp edges cutting people or surroundings while adding strength to the high-loop bracket. Alternate embodiments of the present invention will follow the description of the preferred embodiment and its installation. Where reference numbers in one figure are the same as another figure, those reference numbers carry substantially the same meaning. Preferred sizes, materials and methods of attachment will be discussed, but these preferences are not intended to exclude other suitable or functionally equivalent sizes, materials or methods of attachment.

Figure 2:
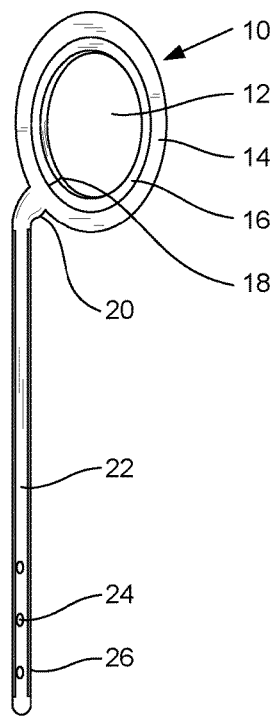
FIG. 2 is perspective view of the high-loop bracket of FIG. 1.
Figure 3:
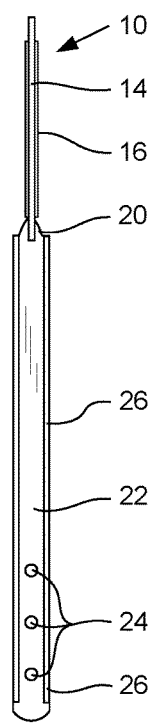
FIG. 3 is a front view of the high-loop bracket of FIG. 1.

As shown in FIGS. 1-3, the top of the preferred high-loop bracket 10 has a hose support portion 14 characterized by a hose aperture 12. An outer diameter of the hose support portion will be determined by the type and thickness of the material used to make the high-loop bracket. The preferred hose support portion is made from approximately 1 mm thick stainless steel (such as 22 gauge) that is die cut to have about a 60 mm outer diameter. An inner diameter of the hose support portion, which effectively defines the hose aperture, is large enough, such as about 40 mm, for an electric dishwashing machine's waste water discharge hose 30 to pass through the hose aperture far enough so that approximately a mid-section of the hose can be supported. When a high-loop bracket is constructed from metal, a guard 16 is preferably installed around an inner diameter of the hose support portion such that there are no sharp edges around the hose aperture that could wear or cut a discharge hose. One such guard is a length of u-shaped plastic or rubber that is pressed around an inside edge of the hose support portion, with the ends of the guard meeting at a split 18. Alternatively, the guard could be tape, foam or other non-abrasive material.

As shown in FIGS. 1-3, the hose support portion 14 is connected to the handle portion 22 of the high-loop bracket 10 by a bend 20. Preferably, the entire high-loop bracket is made from a single sheet of stainless steel, so the bend is made for the purpose of providing a flat mounting surface that causes a discharge hose to run along a cabinet wall. The preferred bend will make about a 90 degree turn so that a plane defined by the handle portion is substantially perpendicular to a plane defined by the hose aperture. When twisting the sheet metal to form the bend, it is preferred that a tangent of an outer diameter of the hose support portion lies approximately in the plane defined by the handle portion so that a discharge hose can be positioned close to a wall of a base cabinet without interfering with the ability to mount the high-loop bracket.

The handle portion 22 of the high-loop bracket 10 shown in FIGS. 1-3 is at least partially continuous with the bend 20. To allow for enough material to make the folded edge 26, the initial width of the sheet metal that is part of the handle portion is much wider than the sheet metal at the bend. The preferred width of sheet metal is about 20 mm, with the each folded edge on either side of the width consuming about 3 mm of the sheet metal. The folded edges should be flattened against the handle portion to reduce exposure of any sharp edges. If desired, a plastic coating or cover can be placed over the handle portion. The overall length of the handle portion in FIGS. 1-3 is about 13 cm, but it could be much longer to accommodate deeper sink basins, such as 30 cm or longer. The free end of the handle portion can be finished so that it is smooth and rounded.

Near an end of the handle portion 22, opposite the hose support portion 14, is a mount portion 24. The mount portion shown in the preferred embodiment is preferably characterized by holes in the handle portion that are sized for common wood screws. The holes shown have about a 4 mm diameter. One or more of the holes can be selected for use at the time the high-loop bracket is installed. A separate holder could be secured to a base cabinet to accept the mount portion, such as by snapping or sliding into place, which might be preferred if the high-loop bracket is constructed of plastic.

Figure 4:
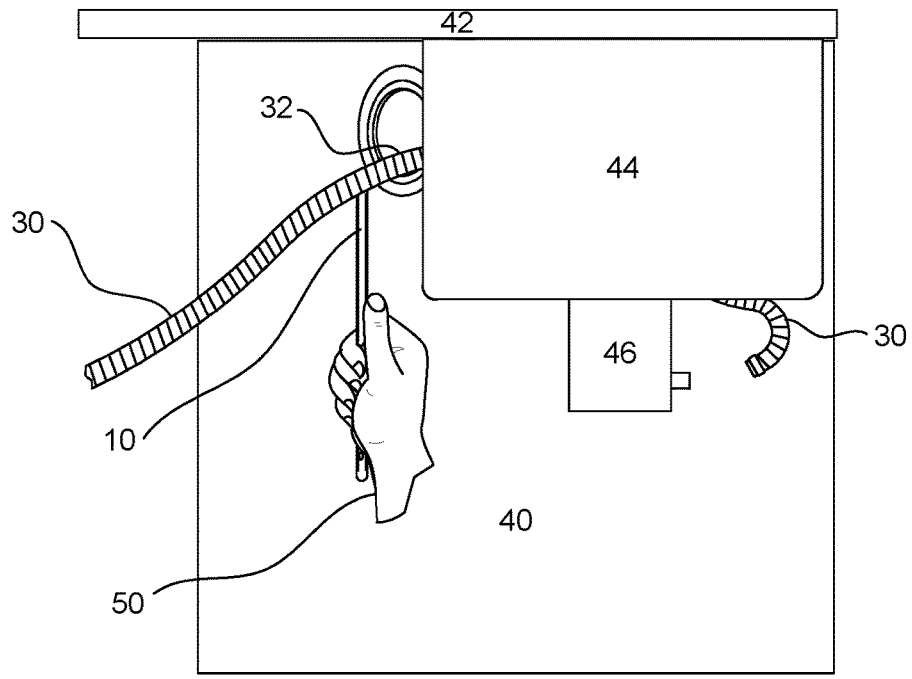
FIG. 4 is a perspective view of the high-loop bracket of FIG. 1 being positioned under a counter top.
Figure 5:
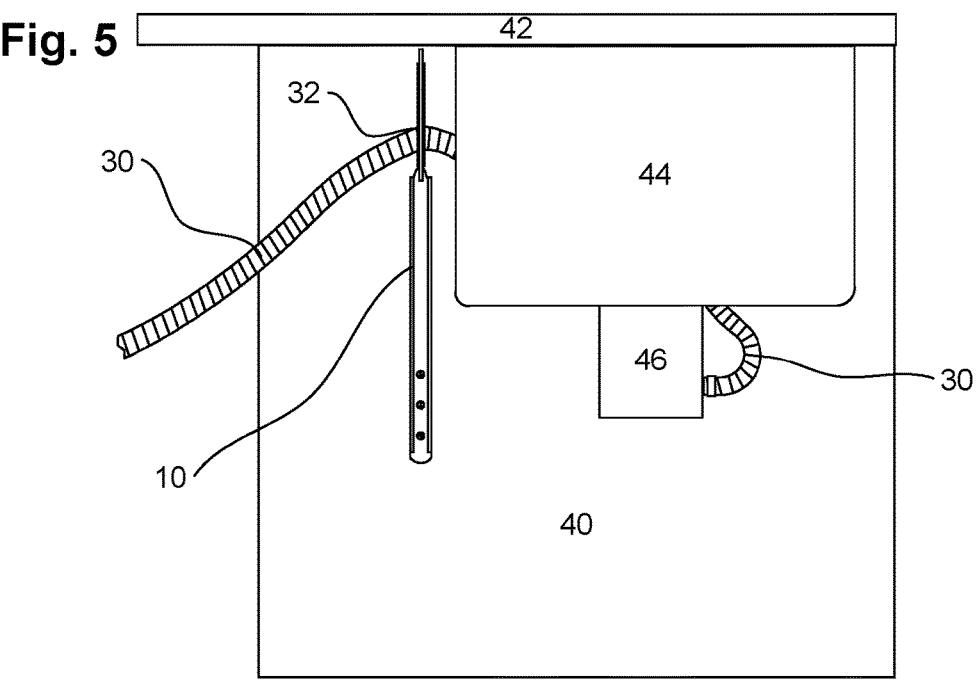
FIG. 5 is a perspective view of the high-loop bracket of FIG. 1 mounted to a sink base cabinet.

To install the preferred high-loop bracket 10, a discharge hose 30 is passed through the hose support portion 14, as shown in FIG. 4. If desired, a hot water supply hose for a dishwasher can be passed through the hose support portion at this time. An installer then grasps the handle portion 22 of the high-loop bracket with their hand 50 and manipulates the high-loop bracket until a desired high rise loop 32 is formed in the discharge hose in a desired position. The high-loop bracket is preferably pushed upward until the hose support portion is near or abuts a countertop 42. Grasping just the handle portion 22 of the high-loop bracket will allow an installer to blindly manipulate the discharge hose between a sink base cabinet 40 and a sink basin 44 until a high rise loop 32 is formed in the discharge hose. As shown in FIG. 5, the mount portion is secured against a wall of the sink base cabinet. A piece of double sided foam tape (not shown) can be used to temporarily position the handle portion against the cabinet. A screw is used to secure the mount portion to the cabinet; and additional screws can be used as deemed necessary. The discharge hose is connected to a garbage disposal 46 in the normal way.

Figure 6:
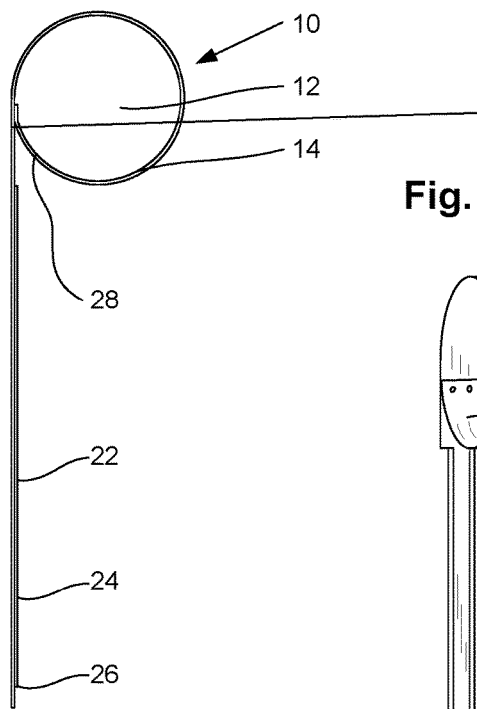
FIG. 6 is a side view of a first alternative embodiment characterized by an alternate hose support portion.
Figure 7:
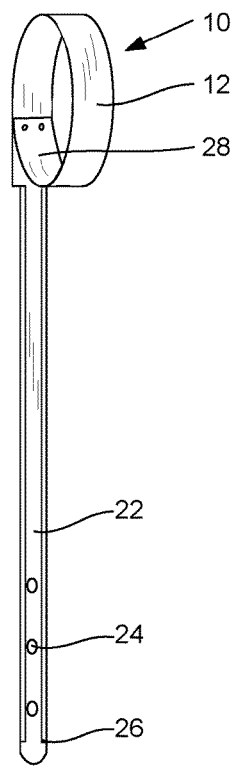
FIG. 7 is a perspective view of the high-loop bracket of FIG. 6.
Figure 8:
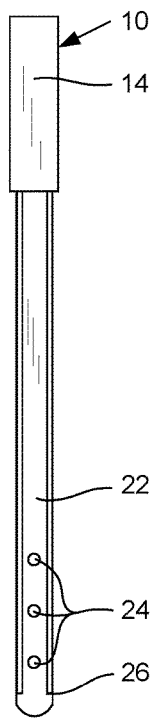
FIG. 8 is a front view of the high-loop bracket of FIG. 6.

FIGS. 6-8 show an alternate embodiment of the high-loop bracket 10 of the present invention. Rather than bending the handle portion 22 by about ninety degrees where it meets the hose support portion 14, the sheet metal is simply curled back on itself to form the hose support portion. Rivets or spot welds 48 can be used to fix the curled end of the hose support portion. The curled end 28 effectively meets the handle portion without any twisting so that forming the high-loop bracket is a relatively simple process. The installation of the high-loop bracket shown in FIGS. 6-8 is the same as for the preferred embodiment. If desired, the folded edges 26 can be extended into the hose support portion so that they are continuous all the way to the curled end.

FIGS. 9 and 10 show another alternate embodiment of the high-loop bracket 10 of the present invention. Sheet metal is stamped to form the piece shown in FIG. 9, including a slot 52 and hook 54. The sheet metal is folded and then rolled until the curled end is close enough to the slot such that the hook can be pushed into the slot to form the hose support portion 14. The hook may be bent to keep it from slipping out of the slot. The hook could be unhooked, if desired, to allow the discharge hose to be inserted into the hose support portion, and then the hook may be reinserted into the slot.

The various embodiments of the present invention can be molded or formed from plastic rather than from sheet metal. One skilled in the art will adjust the thickness of the plastic to achieve a desired strength. Similarly, any folded edges and bends desired in a metal construction can be eliminated to allow for known equivalent structures and processes when making a part out of plastic. As already mentioned, it may be beneficial to make a plastic high-loop bracket as multiple piece parts that are assembled during installation, such as by snapping or sliding parts of the high-loop bracket together.

While a preferred form of the invention has been shown and described, it will be realized that alterations and modifications may be made thereto without departing from the scope of the following claims.

What is claimed is:

1. A method for making a high rise loop in an electric dishwasher's discharge hose comprising the steps of:
   Providing a high-loop bracket comprising: a hose support portion characterized by a hose aperture; a mount portion; a handle portion between the hose support portion and the mount portion; and wherein a length of the high-loop bracket is at least as great as a depth of a sink basin behind which the hose support portion is mounted using the mount portion;
   Passing a discharge hose of an electric dishwasher through the hose aperture of the high-loop bracket;
   Manipulating the handle portion to form a high rise loop in the discharge hose;
   Raising the handle portion to position the high rise loop behind a sink basin and just under a countertop; and
   Securing the mount portion of the high-loop bracket to a sink base cabinet.

2. The method of claim 1, further characterized by temporarily fixing the handle portion to the sink base cabinet with an adhesive before securing the mount portion.

3. The method of claim 1, further characterized by connecting the discharge hose to a garbage disposal.

4. The method of claim 1, further comprising the step of passing a hot water hose through the hose aperture before the step of manipulating the handle portion.

5. The method of claim 1 wherein the high loop bracket is made from die cut sheet metal, and wherein there is a ninety degree bend between the hose support portion and the handle portion.

6. The method of claim 5 wherein any cut edges of sheet metal in the handle portion are folded such that the cut edges are not at a perimeter of the handle portion.

7. The method of claim 6 further comprising a plastic guard around an inner edge of the hose aperture.

8. The method of claim 1 wherein the handle portion is at least 13 cm long.

9. The method of claim 1 wherein the mount portion is characterized by at least two apertures through which wood screws can be used to mount the mount portion to wood.

10. The method of claim 1 wherein a curled end of the hose aperture is rolled back against the hose support portion where it is fixed by a rivet or weld.

11. The method of claim 1 wherein a curled end of the hose aperture is rolled back against the hose support portion where it is fixed by a hook on the curled end that is hooked through a slot.

12. The method of claim 1 wherein cut edges along a length of the high loop bracket are folded, including cut edges that extend into the hose support portion and mount portion.

\* \* \* \* \*